United States Patent
Chen et al.

(10) Patent No.: US 7,680,782 B2
(45) Date of Patent: Mar. 16, 2010

(54) METHOD TO GENERATE SEMANTICALLY VALID QUERIES IN THE XQUERY LANGUAGE

(75) Inventors: Wallace W Y Chen, Markham (CA); Enzo Cialini, Mississauga (CA); David Richard Godwin, Whitby (CA); Anthony Di Loreto, Markham (CA); Ciby Mathew, Toronto (CA); Ronald James Pomeroy, North York (CA)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 11/550,580

(22) Filed: Oct. 18, 2006

(65) Prior Publication Data

US 2008/0097974 A1    Apr. 24, 2008

(51) Int. Cl.
*G06F 17/30* (2006.01)

(52) U.S. Cl. .......................................... 707/4

(58) Field of Classification Search ................ 707/1–10
See application file for complete search history.

(56) References Cited

U.S. PATENT DOCUMENTS

| | | | |
|---|---|---|---|
| 6,601,026 B2 | 7/2003 | Appelt et al. | |
| 6,882,970 B1 | 4/2005 | Garner et al. | |
| 7,003,445 B2 * | 2/2006 | Humphreys et al. | 704/9 |
| 2002/0156810 A1 | 10/2002 | Holland et al. | |
| 2005/0022115 A1 * | 1/2005 | Baumgartner et al. | 715/513 |
| 2005/0050030 A1 * | 3/2005 | Gudbjartsson et al. | 707/3 |
| 2006/0155725 A1 * | 7/2006 | Foster et al. | 707/100 |
| 2007/0168336 A1 * | 7/2007 | Ransil et al. | 707/3 |

\* cited by examiner

*Primary Examiner*—Diane Mizrahi
(74) *Attorney, Agent, or Firm*—Yee & Associates, P.C.; Justin M. Dillon (57) ABSTRACT

A computer implemented method, apparatus, and computer usable program code for automatically generating a query. Data and occurrence is described using a sequence type. The data and occurrence from the sequence type are matched to a sequence type pattern. Sentences in a query language are generated automatically using the sequence type pattern for testing an ability of a query processing engine to interpret queries.

15 Claims, 10 Drawing Sheets

OrExpr($p)
  ($p is boolean=>AndExpr((boolean|string)[3,1]),
"or">[2.5] | default=>AndExpr($p))[3,2]
;

Expr($p)
Default=>ExprSingle($p[$v]),",">[2..5]
;

Function Expr(SequenceType)
Loops=random(2,6)
Types=split(SequenceType.ItemType)
Multiplicity=split(SequenceType.Multiplicity)
For loop in loops
    if loop>2
    generate","/*top-level comma to separate multiple ExprSingle*/ invoke ExprSingle(SequenceType(types[loop], multiplicity[loop]))
;

A.1 Lexical Definitions                                    1400

DIGIT : ["0"-"9"]
NUM : (<DIGIT>)+
ID : ["A"-"Z","a"-"z","_"] (["A"-"Z","a"-"z","_","0"-"9"])*
TEXT : "\"" ([~"\""])* "\""
VAR : "$" <ID>

A.2. Productions

Start -> "template" <ID> "{" (RuleDefinition)+ "}" "template" <ID>   1402
RuleDefinition -> RuleHeader RuleBody ";"
RuleHeader -> <ID> "(" [<VAR>] ")"   1404
RuleBody -> RuleClause   1406
          |
            "(" RuleClause ("|" RuleClause)+ ")" "[" <NUM> (","<NUM>)+ "]"
RuleClause -> PatternMatch "=>" RuleTypeList   1408
PatternMatch -> (SequenceType | <VAR>) ("in"|"is") (SequenceType | <VAR>)
              |
                "default"                                                1410
RuleTypeList -> (RuleType)+
RuleType -> <TEXT>
          |
            RuleCall
          |
            "user" "(" RuleTypeList ")"
          |
            "<" RuleTypeList ["," RuleTypeList] ">"
              (("[" <NUM>".."<NUM> "]") | ("user" "("RuleCall")"))
          |
            "(" RuleTypeList ("|" RuleTypeList)+ ")"
              (("[" <NUM> (","<NUM>+ "]") | (user "(" RuleCall ")"))
RuleCall -> <ID> "(" [ActualParameterList] ")"
ActualParameterList -> ActualParameter
              |
                "(" ActualParameterList ("|" ActualParameterList)+")"
                "[" <NUM> ("," <NUM>+ "]"
ActualParameter -> (SequenceType | <VAR> ["[" <VAR> "]"])
SequenceType -> ( "empty()" | "item"() | "node()" | "comment()" | "text()"
        | ElementTest | SchemaElementTest | AttributeTest
        | SchemaAttributeTest | ProcessingInstructionTest
        | DocumentTest | QName) ["?" | "*" | "+"]
ElementTest -> "element(" NameOrWildcard ["," QName ["?"]]] ")"
SchemaElementTest -> "schema-element(" QName ")"
AttributeTest -> "attribute(" [NameOrWildcard ["," QName]] ")"
SchemaAttributeTest -> "(" QName ")"
ProcessingInstructionTest -> "processing-instruction(" [QName] ")"
DocumentTest -> "document-node(" [ElementTest | SchemaElementTest] ")"
NameOrWildcard -> QName | "*"
                                          QName -> <ID> [":" <ID>]

FIG. 14

```
template XQUERY {

Module()
  default => <VersionDecl()> user(_VersionDeclOccurs())
    ( MainModule() | LibraryModule() ) user(_ModuleChoice())
;

(: omitted :)

QueryBody($p)
  default => Expr( $p )
;

Expr( $p )
  default => <ExprSingle($p[$v]),",">[1..2]
;

ExprSingle( $p )
  default => ( FLWORExpr( $p )
        | QuantifiedExpr( $p)
        | TypeswitchExpr( $p )
        | IfExpr( $p)
        | OrExpr( $p )) [3,1,0,2,1]
;

(: omitted :)

FilterExpr( $p)
  default => PrimaryExpr( $p ) PredicateList()
;

(: omitted :)

PrimaryExpr( $p )
  default => (
    user(_PrimaryExpr( $p ))
      (: Literal | VarRef | ContextExpr | FunctionCall | Constructor | () | IStep :)
    |
    "(" Expr( $p ) ")"
    |
    FunctionCall( $p )
    |
    "ordered" "{" Expr( $p ) "}"
    |
    "unordered" "{" Expr( $p ) "}"
    ) [3,1,10,0,0]
;

(: omitted :)

}template XQUERY
```

METHOD TO GENERATE SEMANTICALLY VALID QUERIES IN THE XQUERY LANGUAGE

BACKGROUND OF THE INVENTION

1. Field of the Invention

The present invention relates generally to an improved data processing system and in particular to a computer implemented method and apparatus for generating queries. Still more particularly, the present invention relates to a computer implemented method, apparatus, and computer usable program code for automatically generating semantically valid queries in the XQuery language.

2. Description of the Related Art

XQuery is the query language for extensible markup language (XML). A query is a request or a specific set of instructions for extracting particular data from a database. Queries are made up of data items or fields to be retrieved and may have limits set on the scope of the data and/or sorting order specified.

XQuery is being developed to provide a flexible and standardized way of searching through semi-structured data that is physically stored as XML, virtualized as XML, or viewed as XML via middleware. XQuery provides a mechanism to extract and manipulate data from XML documents or any data source that can be viewed as XML, such as relational databases or office documents. XQuery is designed to be broadly applicable across many types of XML data sources.

For example, just as structured query language (SQL) is a query language that queries relational tables to create new relational tables, XQuery queries XML documents to create new XML documents. XQuery is still under development, and at present, there are no known solutions directed toward automatically generating test input to test the functionality of a query processing engine.

SUMMARY OF THE INVENTION

The illustrative embodiments provide a computer implemented method, apparatus, and computer usable program code for automatically generating a query. Data and occurrence is described using a sequence type. The data and occurrence from the sequence type are matched to a sequence type pattern. Sentences in a query language are generated automatically using the sequence type pattern for testing an ability of a query processing engine to interpret queries.

BRIEF DESCRIPTION OF THE DRAWINGS

The novel features believed characteristic of the illustrative embodiments are set forth in the appended claims. The illustrative embodiments themselves, however, as well as a preferred mode of use, further objectives, and advantages thereof, will best be understood by reference to the following detailed description of an illustrative embodiment when read in conjunction with the accompanying drawings, wherein:

FIG. 14 is exemplary rule-specification grammar in accordance with the illustrative embodiments;

DETAILED DESCRIPTION OF THE PREFERRED EMBODIMENT

Figure 1:
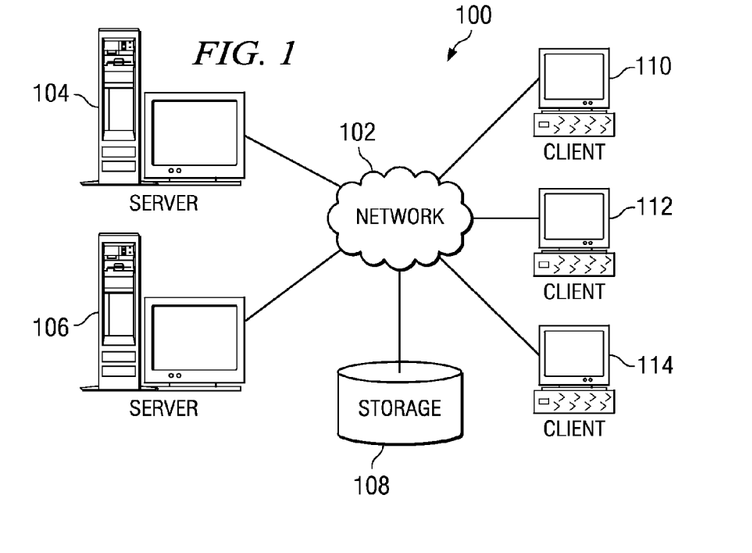
FIG. 1 is a pictorial representation of a data processing system in which the illustrative embodiments may be implemented.
Figure 2:
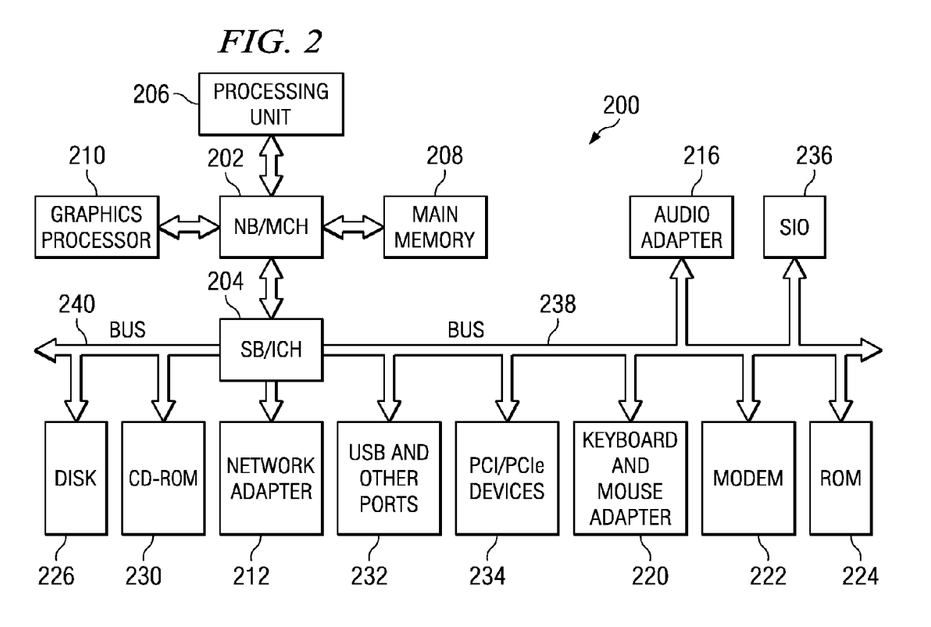
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for generating semantically valid queries in the XQuery language. The illustrative embodiments present a methodology to generate sentences in the XQuery language that are both syntactically and semantically valid so that the sentences may be compiled. Particularly, the illustrative embodiments allow a user or vendor to generate valid sentences in the XQuery language to use as input to test a query engine. In XQuery there are an infinite number of possible sentences, and the generator increases test coverage by automatically generating a volume of sentences of varying complexity, well beyond what is manually possible.

A sentence is a program unit that is deemed sufficient for evaluation by a language compiler. Test coverage provided by the randomly generated sentences may include: 1. top-level expressions separated by commas, 2. FLWOR expressions, 3. quantified expressions, 4. conditional expressions, 5. primary expressions, such as literals including strings, numeric, date, time, local and external variable references, context items, function calls, constructors, parenthesized expressions, and XPath™ expressions, 6. expressions including arithmetic, comparison, boolean, set, and cast, 7. built-in functions, 8. variable definitions, 9. data types from XML schema and XQuery, and 10. sequence types. The generated XQuery sentences will exhibit combinations of these language features. Presumably, each unique combination drives a unique code path in the query engine which will ideally identify and report unexpected error conditions. In addition, the generated sentences may be executed concurrently which increases test coverage. Examples of sentences in XQuery include instances of expressions which may be as simple as a literal value or more complex as a FLWOR expression. Consider the sentence 5 which evaluates to the value 5, and the sentence for $v in (1,2) return $v which evaluates to the sequence (1,2).

As the sentences are submitted to a query engine, the sentence will execute functionality in the query engine that should strive to achieve the intent of the sentence. As a result, sentences may be used to test the behavior of the query engine, and test coverage may be enhanced by altering the content and structure of the sentences. The illustrative embodiments may be applicable to any number of functional languages. XQuery is used as one example of a functional language.

The illustrative embodiments presume a language whose building blocks are expressions that may be composed hierarchically, where every building block in the hierarchy evaluates to a certain sequence type. There are multiple possible ways to compose an expression hierarchy that evaluates to an arbitrary sequence type, and each unique composition represents a different sentence in the language. The invention generates an arbitrary sentence by creating a sequence type description, called a sequence type pattern, to guide the composition of an expression hierarchy. The term "goal" is used in the present description and claims to denote a sequence type pattern that the composition should strive to evaluate to regardless of structure. The composition is represented as a syntax tree, similar to one used internally in a language compiler, and different sentences may be produced by varying compositions, and by varying the data values used in a sentence, both actions being features that may be used to improve test coverage.

Figure 3:
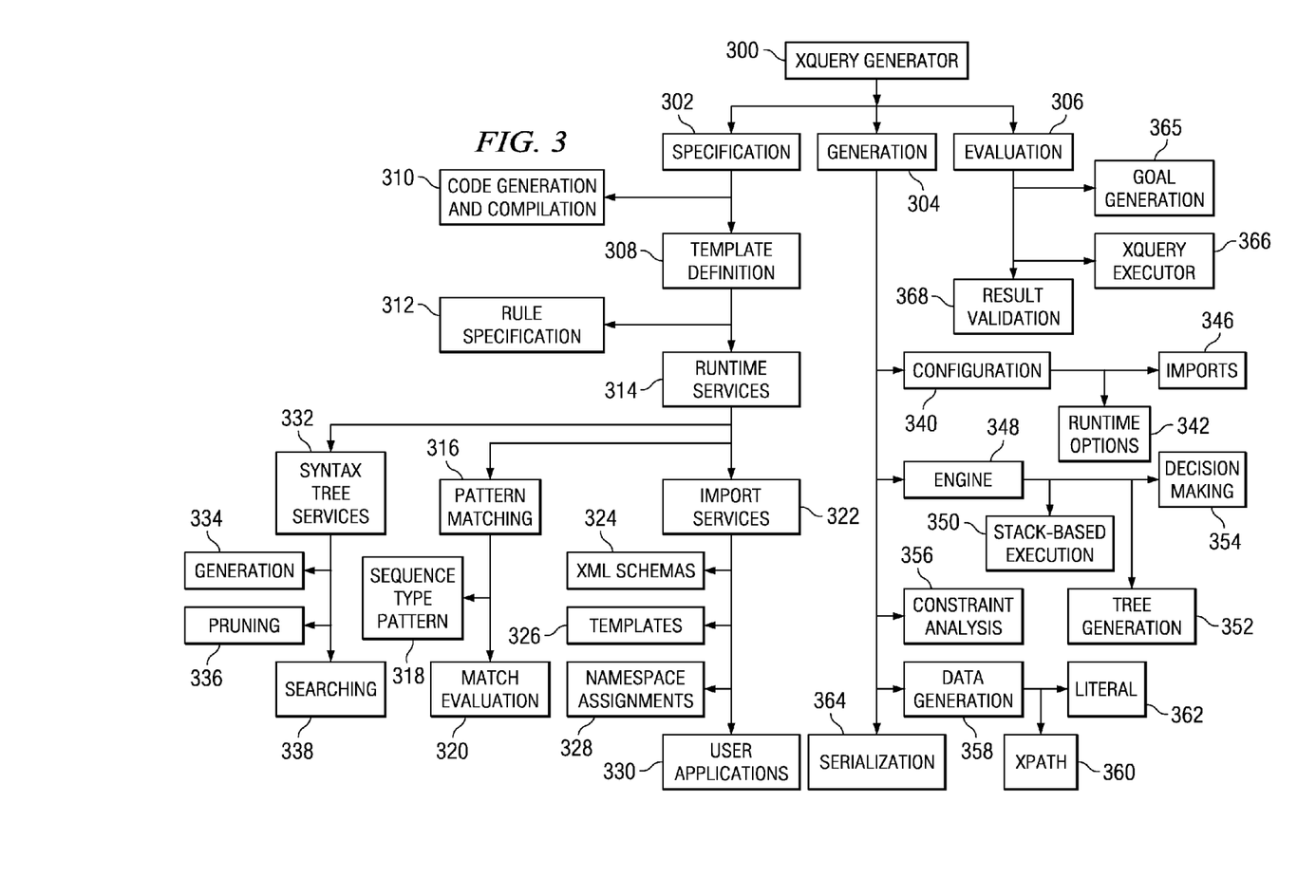
FIG. 3 is a block diagram for XQuery generation and execution in accordance with the illustrative embodiments.

FIG. 3 is a block diagram for XQuery generation and execution in accordance with the illustrative embodiments. FIG. 3 is a decomposed view of XQuery generator 300 explaining the different modules or components for generating and executing XQuery sentences according to one illustrative embodiment. XQuery generator 300 may be used for any number of database systems, such as DB2™ of International Business Machines and Oracle database products. XQuery generator 300 is more specifically divided into specification 302, generation 304, and evaluation 306.

Specification 302 includes modules for template definition 308, code generation and compilation 310, rule specification 312, runtime services 314, pattern matching 316, sequence type pattern 318, match evaluation 320, import services 322, XML schemas 324, templates 326, namespace assignments 328, user applications 330, syntax tree services 332, generation 334, pruning 336 and searching 338.

Generation 304 includes modules for configuration 340, runtime options 342, imports 346, engine 348, stack-based execution 350, tree generation 352, decision making 354, constraint analysis 356, data generation 358, XPath 360, literal 362, and serialization 364. Engine 348 is a rule-based engine used for XQuery generator 300. Evaluation 306 includes goal generation 365, XQuery executor 366, and result validation 368.

Specification 302 is the manual encoding of rules, such as rules included in rule specification 312 as a program template in template definition 308. Specification 302 further includes the definition of a library of runtime services 314 which includes syntax tree services 332, functionality for sequence type pattern matching in pattern matching 316, and input state to the generator from import services 322. Specification 302 is translated by code generation and compilation 310 to a program that may be compiled and executed. Generation 304 is influenced by imported definitions from imports 346 and user-directives from runtime options 342 that control generation 304. Engine 348 relies on a stack within stack-based execution 350 for maintaining nested rule invocation, tree generation 352, and decision making 354. The syntax tree is post-processed through constraint analysis 356 that relates expressions. Data generation 358 fills in values before serialization 364 in which a sentence is serialized. Evaluation 306 orchestrates the generation and execution of a sentence and also verifies result validation 368 of the behavior of a database query engine.

Rule specification 312 limits test coverage to those aspects of the XQuery grammar that may adequately exercise the database query engine. In other words, rule specification 312 models the test requirements of the database query engine. Rule specification 312 and runtime services 314 are translated and compiled by code generation and compilation 310 into a library.

The library includes routines that drive the generation of sentences. A routine is invoked with an actual parameter, such as sequence type pattern 318, as a goal, and the rule specification executes as a series of nested routine invocations. During execution by engine 348, a syntax tree is built by syntax tree services 332, whose root is generated from an initial routine to which nodes are added in hierarchical order of evaluation: a syntactic node for each language keyword and a tree fragment rooted at a semantic node for each nested routine invocation. Syntax tree services 332 manages generation 334 of nodes, pruning 336 to remove superfluous nodes, and searching 338 the tree for semantic information. Other runtime services 314 include pattern matching 316 to determine if a goal applies in a rule clause and import services 322 that import XML schemas 324, rule specifications in the form of templates 326, namespace assignments 328, and user applications 330 that augment decision making.

A user primes the execution environment with library locations in the form of imports 346 and runtime options 342 and then invokes an entry point in generation 304 with a goal. During execution by engine 348, a stack in stack-based execution 350 records rule invocations and the depth at which the invocations occur. A rule is popped off the top of the stack when it has been evaluated, and the syntax tree fragment that results from the invocation is added as a child of the node corresponding to the invoking rule by tree generation 352. Keywords are treated as syntactic rule invocations. Decisions in decision making 354 are made by either a random decision when the outcome is independent of the execution environment or by user-applications 330 otherwise.

The syntax tree is deemed completely generated by tree generation 352 when the initial rule completes and is subsequently subjected to constraint analysis 356. At this point, the semantic leaf nodes in the tree are placeholders for primary expressions and must be filled with type-compatible data values. Constraint analysis 356 traverses the tree and searches for opportunities to use variable definitions introduced in the body, as well as to relate those variable definitions through constraints. Constraint analysis 356 also attempts to minimize comparisons that are perpetually false and invalid expressions, such as a division by zero. Semantic leaf nodes may be assigned variables, sequences of values, and expressions, such as literal 362 and XPath 360.

Serialization 364 serializes the syntax tree as a character string and makes the character string available for evaluation 306. For example, evaluation 306 may be performed by XQuery executor 366. As noted earlier, XQuery generator 300 is initiated by a test harness which invokes an entry point in rule specification 312. A test harness provides a mechanism for sending test queries to the XQuery database engine. The serialized query is then prepared and submitted by XQuery executor 366 to the database query engine. Result validation 368 may validate the query by examining the outcome of the query engine. The test harness may validate the query. For example, an error code, such as arithmetic overflow, from the query engine requires further investigation to determine if the query engine was incorrect or experienced a failure.

XQuery generator 300 is especially useful for generating a large volume of queries in a relatively short time. The structure of each query, as well as the choice of data values, is influenced by random decisions and user-application logic. For example, a single syntax tree may serve as the basis for multiple queries which differ only by data values or alternately, the queries may originate from distinct syntax trees. Test coverage may cover most of the XQuery language including: language constructs and semantics, data types, values including literals, sequences, and XPath expressions, complex nested expressions, and so forth. Since sentence variety is instrumental to exercising code in the query engine, XQuery generator 300 is most effective when executed over a period of time during which the execution environment and decision making is varied in order to generate varied queries.

Figure 4:
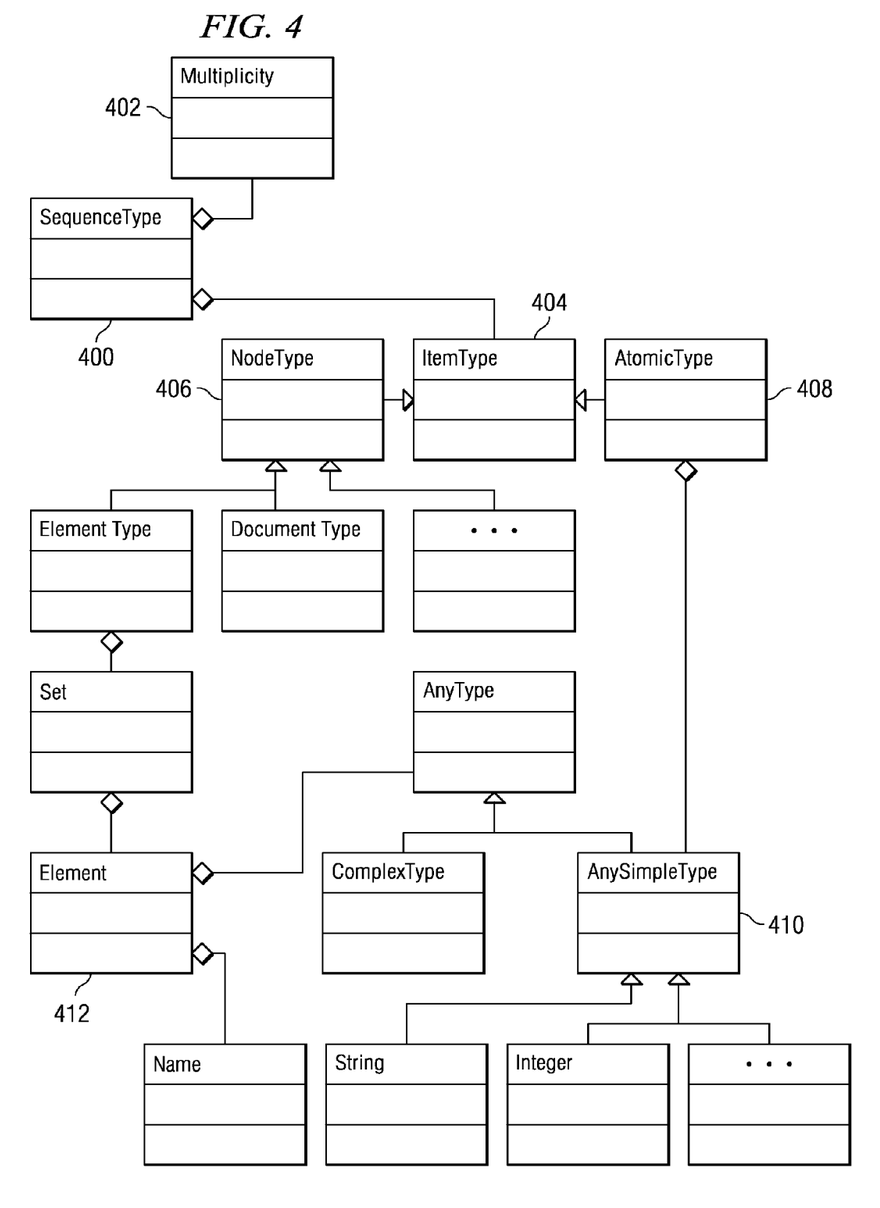
FIG. 4 is an example of a sequence type in accordance with the illustrative embodiments.

FIG. 4 is an example of a sequence type in accordance with the illustrative embodiments. Sequence type 400 describes data and occurrence. Sequence type 400 is part of a built in type system of an XQuery generator, such as XQuery generator 300 of FIG. 3. Data in sequence type 400 is described by a hierarchy of types. Various illustrative embodiments suggest a similarity of sequence type 400 with sequence type of the XQuery/XPath data model. Sequence type 400 is the type of system used by the XQuery generator to describe and search for XML type information. Sequence types are used to describe element and attribute declarations in an XML schema, as well as their occurrence. Each node in an element hierarchy is associated with a sequence type, and this information is used when searching an element declaration for all elements or attributes that match a sequence type pattern. If a match is found, the result of searching is a location path, namely a series of sequence types that identify a matching node relative to a search origin.

Sequence type 400 includes item type and occurrence. Occurrence is a form of counting similar to that of regular expressions and is used to indicate the number of times a certain item type may occur, such as optionality and multiplicity. There are four occurrence indicators which indicate whether a certain item type may be optional or mandatory, expressed as optionality. The number of times the item type may occur are expressed as multiplicity 402 including: zero or one time, zero or more times, exactly one time, and one or more times. Multiplicity 402 is used to match the number of times a certain item type occurs.

Item type 404 is one from the item type hierarchy which has a root item type that specializes into node type 406 and atomic type 408 hierarchies. Item type 404 is used to match any type of literal or XML markup. Node type 406 specializes into the XML node types which may include element, attribute, schema-element, schema-attribute, comment, processing-instruction, text, and document. Atomic type 408 hierarchy is rooted at the generic AnySimpleType 410 which specializes into various numeric, string, date, and time types. The leaf types referred to are the leafs of the item type hierarchy. Leafs are types that do not specialize any further, and this list includes the atomic type and the types specialized from the node type. The non-leaf nodes in the item type hierarchy include item type 404 and node type 406. Leaf nodes include atomic type 408, element 412, attribute, comment, processing instruction, text, and document. Schema import is a facility that may be enabled by a vendor to bring element and attribute declarations and type definitions from XML schema documents in scope during XQuery compilation.

Figure 5:
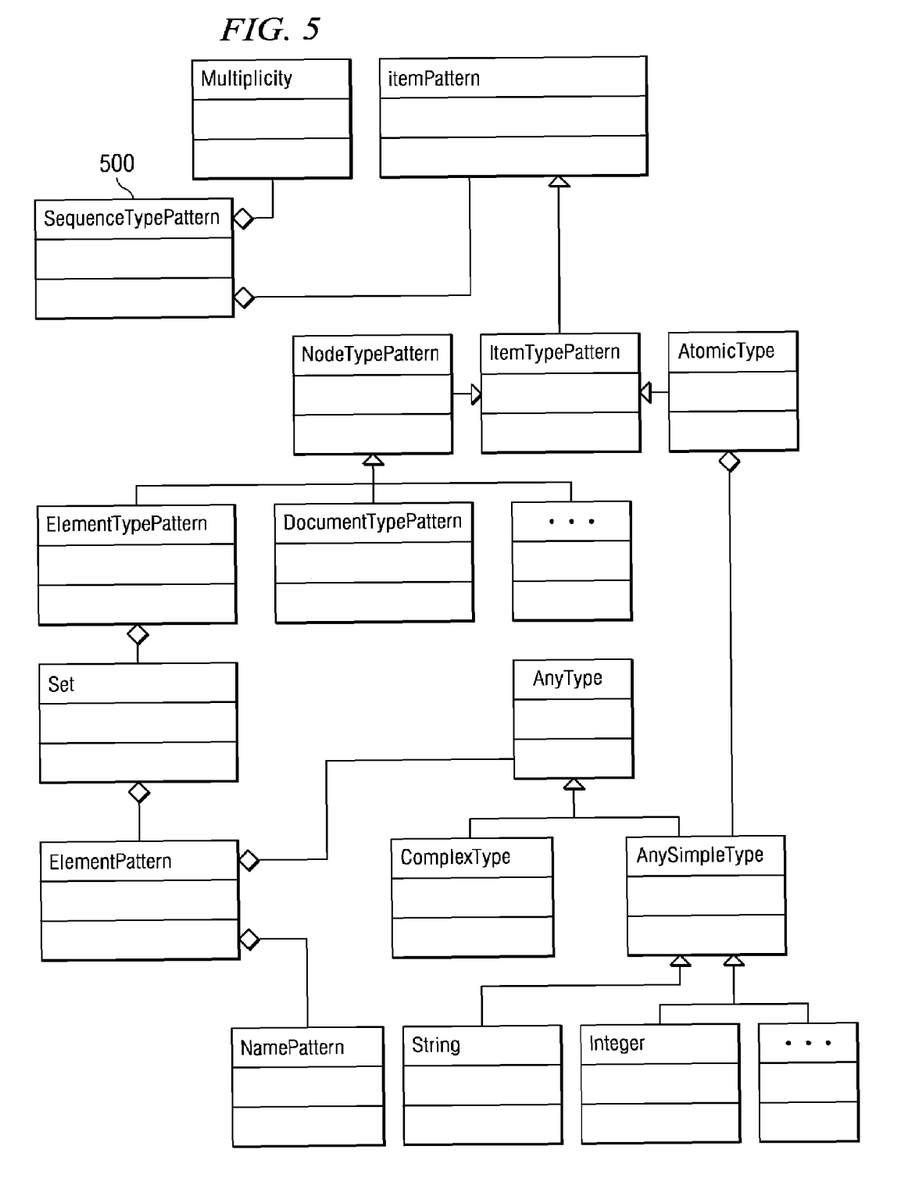
FIG. 5 is an example of a sequence type pattern in accordance with the illustrative embodiments.

FIG. 5 is an example of a sequence type pattern in accordance with the illustrative embodiments. Sequence type pattern 500 provides the functionality to match sequence types, such as sequence type 400 of FIG. 4 by matching both type and occurrence. Sequence type pattern 500 is a description language used in searching for matching sequence types.

Sequence type patterns, such as sequence type pattern 500 may range in specificity from a wildcard to an exact match. A sequence type matches sequence type pattern 500 if every type component in the sequence type matches a component in sequence type pattern 500, and the occurrence of the sequence type is a subset of sequence type pattern 500.

As an example, an item type pattern composite of a decimal pattern and an element wildcard which occurs zero or more times matches a byte (byte being a subtype of decimal), element of any name and type (using element wildcard), item type composite of an integer (supertype of decimal and element), a byte, and an element of any name and type, regardless of occurrence (zero or more times).

The query generator consists of rules that embody the syntax and semantics of the XQuery grammar. A rule is similar to a production in context-free grammar. The left-hand side of the rule is the rule identifier, and the expansion is a body of rule invocations. The result of invoking a rule is either a semantic node or a syntactic node. The nodes that result from a rule invocation are added as children of the node that results from the invoking rule. A semantic node is a tree whose leaves are a mixture of syntactic and semantic nodes which terminate as primary expressions.

Conceptually, the XQuery grammar may be mapped into this system of rules, and when executed starting at an entry rule, will generate a syntax tree whose leaf nodes may be preordered into a sentence in the XQuery language. Start production is an entry point in a grammar that is used by a parser to make sense of input to the parser. This scheme for generating a sentence is like an inverted parser which produces tokens instead of consuming them. Although the tokens may be syntax validated against the XQuery grammar, the sentence may still be semantically invalid. For example, an arithmetic expression appears to allow the addition of type incompatible primary expressions. However, it is possible to capture language constraints by a combination of the rule specification and constraint analysis. The rule specification reflects semantics, such as atomization, effective boolean value, and type compatibility through static constraints encoded in rule definitions, such as permitting (by atomization) the addition of an element of type integer to an atomic type integer but not an atomic type date. Constraint analysis extends the static constraints with dynamic search for matches in the execution state of the query generator, such as matching exactly one element node by filtering every location step of an XPath expression to just the first item.

The rules are enhanced to optionally accept a goal to achieve. The goal is sequence type pattern 500, and this filters out rules that cannot generate expressions whose sequence type matches the input pattern. The match semantics are dictated by the XQuery language. For example, an additive expression may match an input goal of integer sequence type pattern and may evolve to add an element of type integer with an integer literal. By contract, the rules in a specification will delegate goals that do not match any rule clause in the rule body to subsequent rules for evaluation until a match is discovered. A matching rule may invoke new rules with possibly new goals.

When modeling context-free grammar using a system of rules, it is necessary to consider the effect of concatenation, listing, and alternation. Rule invocations that are concatenated result in sibling nodes. Listing is an abbreviated form of concatenation, and alternation introduces the choice to select a rule to invoke. The composite nature of lists and choices allows for embedding one in another, therefore adding expressiveness to the rule specification grammar. Some form of decision making is required to terminate a list or to make choices. These considerations may be applied programmatically when generating a syntax tree of nodes rooted at a start production.

Figure 15:
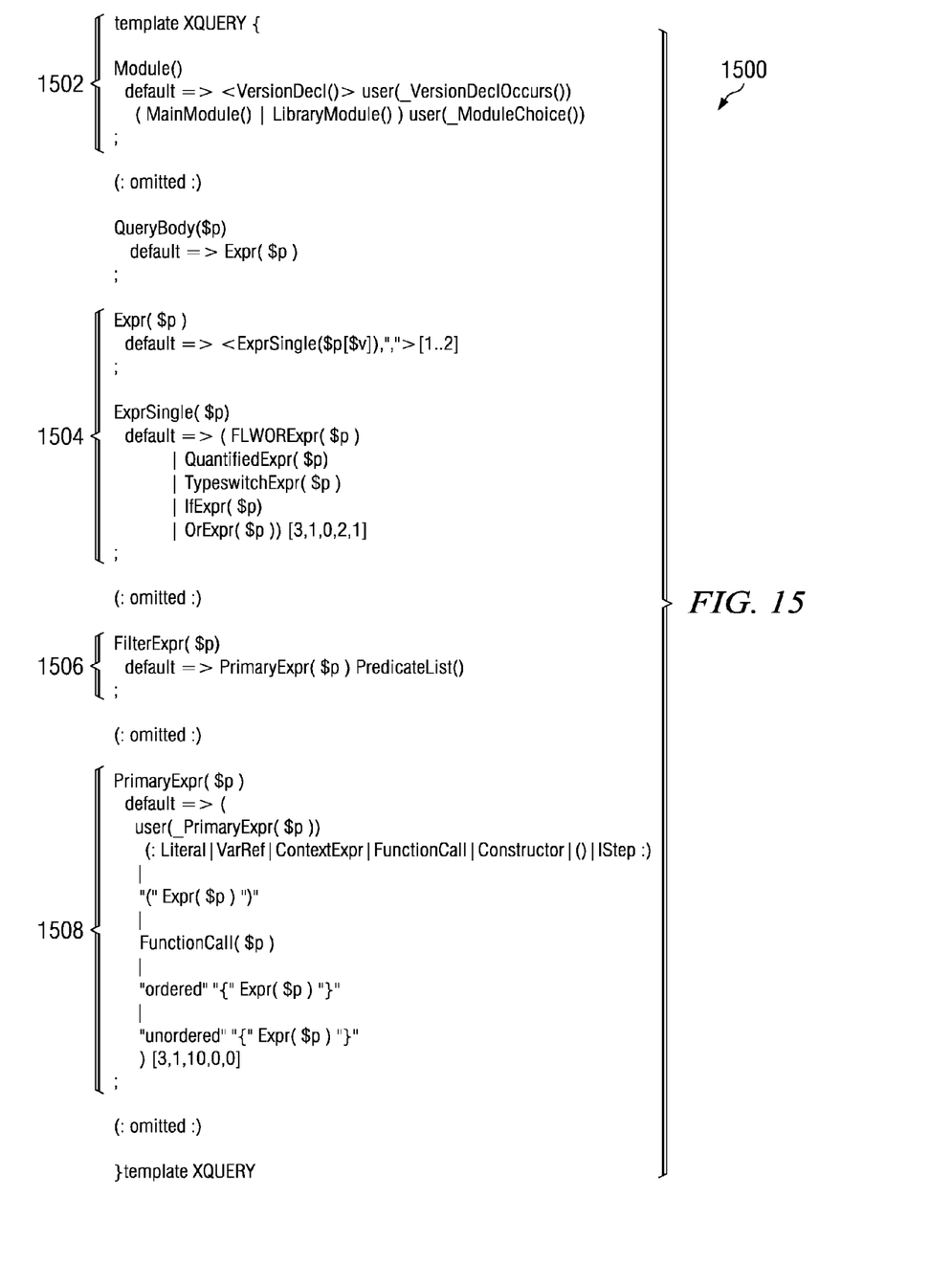
FIG. 15 is an exemplary rule specification in accordance with the illustrative embodiments.

Rule specifications may be defined in grammar that is suitably expressive and which may be translated into a programming language as shown in the example of FIG. 15. When defining rule specifications, the grammar may be enhanced with a construct to escape into the programming language in order to extend the expressiveness of the grammar. See FIG. 14 for an example of grammar details with the facilities herein described.

Figure 6:
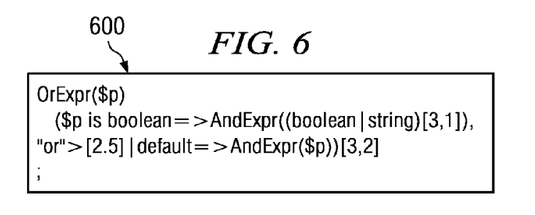
FIG. 6 is an exemplary rule clause in accordance with the illustrative embodiments.

FIG. 6 is an exemplary rule clause in accordance with the illustrative embodiments. Rule clause 600 is an exemplary rule clause. Rule clause 600 may generate between two and five logical OR expressions.

Figure 7:
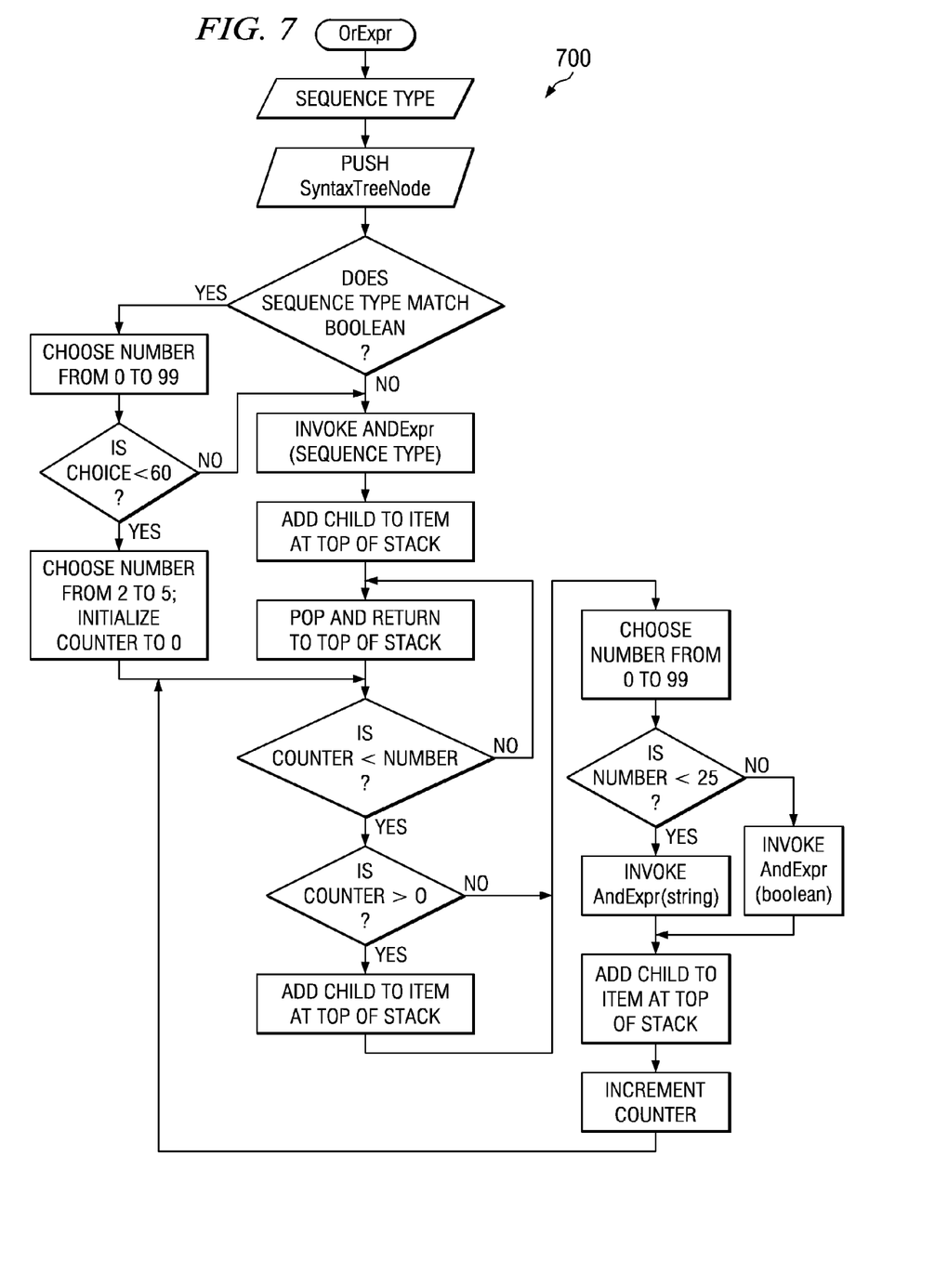
FIG. 7 is a hierarchical flowchart of generated code for the rule clause of FIG. 6 in accordance with the illustrative embodiments.

FIG. 7 is a hierarchical flowchart of generated code for the rule clause of FIG. 6 in accordance with the illustrative embodiments. Flowchart 700 illustrates an example of code generated for rule clause 600 of FIG. 6.

Figure 8:
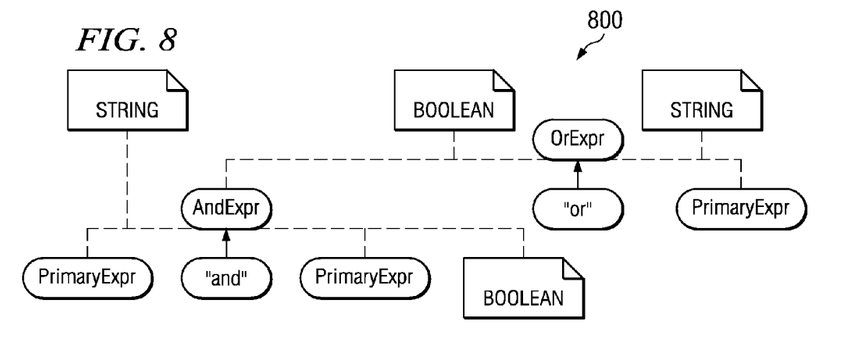
FIG. 8 is an example of a generated syntax tree for the rule clause of FIG. 6 in accordance with the illustrative embodiments.

FIG. 8 is an example of a generated syntax tree for the rule clause of FIG. 6 in accordance with the illustrative embodiments. Syntax tree 800 is a syntax tree for rule clause 600, ORExpr, of FIG. 6. Syntax tree 800 may be generated by XQuery generator 300 and specifically tree generation 352, both of FIG. 3.

The query generator begins at a rule that symbolizes a start production. An input goal is tested for relevance at the rule, and where a match is not possible, the goal is delegated through a default clause to a subsequent rule. Where more than one match is possible, one is selected for actioning which means the rules in the rule action are invoked. Depending on the context, an actioning rule may generate new goal arguments to rules that are invoked. These arguments may be unrelated to the input goal. For example, a logical OR-expression of two integers results in a boolean type.

Figure 11:
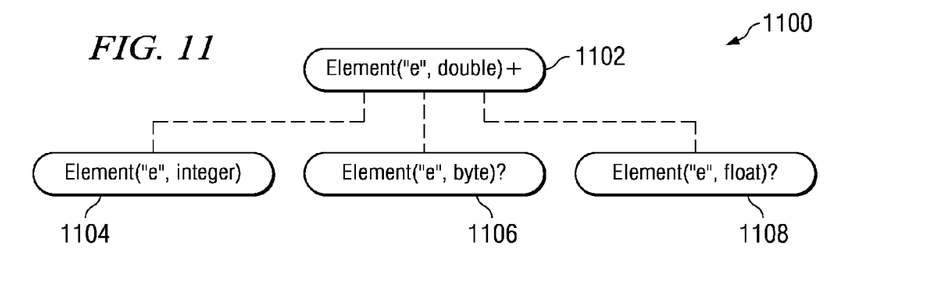
FIG. 11 is an exemplary split of a sequence type pattern in accordance with the illustrative embodiments.
Figure 12A:
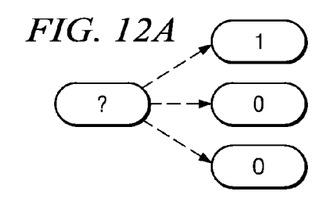
FIGS. 12A-12D are exemplary splits for multiplicity in accordance with the illustrative embodiments.
Figure 12B:
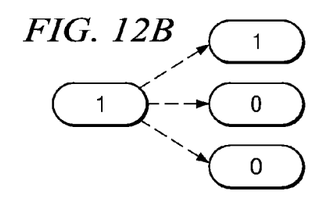
Figure 12C:
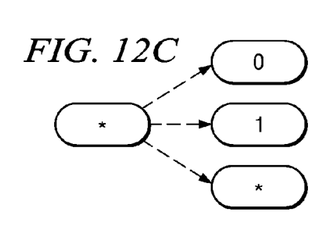
Figure 12D:
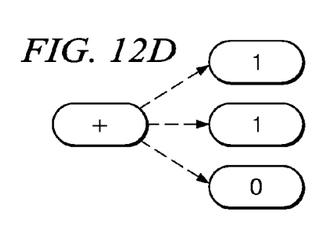

In certain contexts, the input goal may be "split" as shown in FIG. 11, in order to add variety to the query. The split algorithm must ensure that a merge of the sub-goals will yield a subset of the original goal in order to maintain semantic validity. The goal splits are distributed as arguments to the actioned rules. For example, an expression may be split into multiple single expressions. The rule flow terminates in a primary expression rule which is assigned a goal. Generated syntax tree 800 has leaf primary expression nodes, each of which is bound to a sequence type pattern that was supplied as a goal. Syntax tree 800 is post processed by a tree-traversal algorithm which fills each primary expression node with an expression whose sequence type matches the stored goal as further illustrated in FIG. 13.

Figure 9:
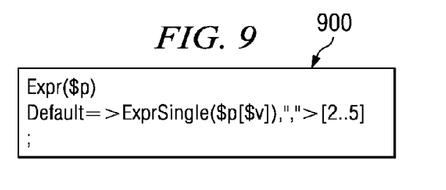
FIG. 9 is a rule from the specification language in accordance with the illustrative embodiments.

FIG. 9 is a rule from the specification language in accordance with the illustrative embodiments. XQuery expression rule 900 is an exemplary expression for illustrating split parameters for generating two to five expressions. The syntax of XQuery expression rule 900 uses an array subscript as seen in the Java® programming language to denote a split.

Figure 10:
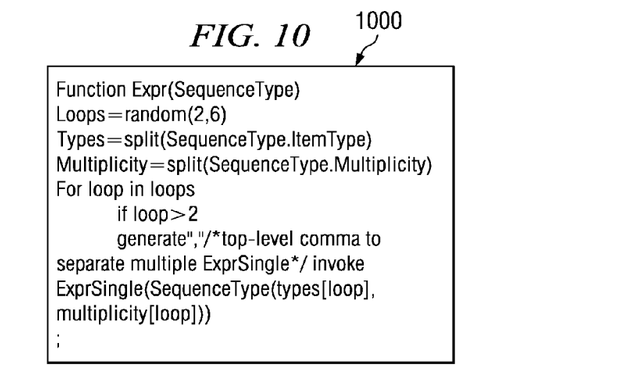
FIG. 10 is pseudo-code generated for the rule of FIG. 9 in accordance with the illustrative embodiments.

FIG. 10 is pseudo-code generated for the rule of FIG. 9 in accordance with the illustrative embodiments. Pseudo-code 1000 is an example of code generated for XQuery expression rule 900 of FIG. 9. Pseudo-code 1000 illustrates a random split of sequence type pattern $p of FIG. 9 into two or more sequence type patterns.

FIG. 11 is an exemplary split of a sequence type pattern in accordance with the illustrative embodiments. Element sequence type pattern 1100 shows element 1102 which is of type double being split into element 1104, element 1106, and element 1108.

FIGS. 12A-12D are exemplary splits for multiplicity in accordance with the illustrative embodiments. FIGS. 12A-12D present examples of three-way splits of various multiplicity indicators. Splits may be performed in an infinite number of ways.

Figure 13:
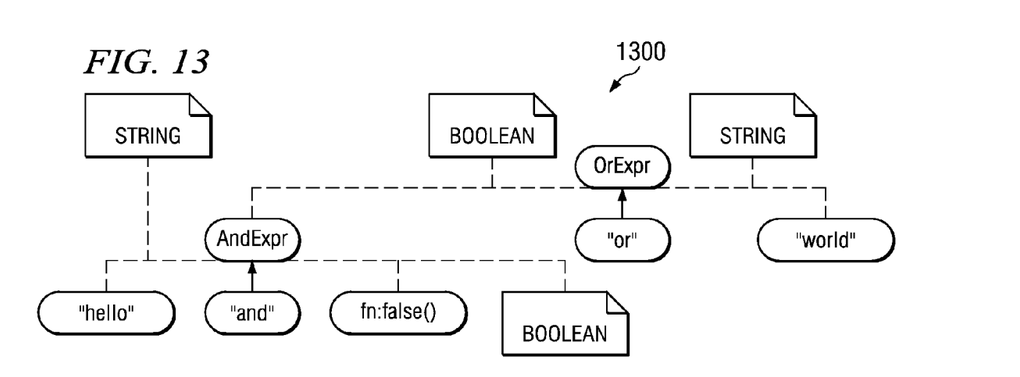
FIG. 13 is an exemplary syntax tree after primary expression assignments in accordance with the illustrative embodiments.

FIG. 13 is an exemplary syntax tree after primary expression assignments in accordance with the illustrative embodiments. A generated syntax tree, such as syntax tree 800 of FIG. 8 is post processed by a tree-traversal algorithm which fills each primary expression node with an expression whose sequence type matches the stored goal. The tree-traversal algorithm may be enhanced in capability to produce complex relationships where there is opportunity to do so. For instance, the result of an expression may be an XPath expression and may be inverted using XPath and direct constructors in order to add test coverage. As another example, predicates may be restricted to those that evaluate to true in order to ensure a result set.

While a test suite of queries of random structure is useful in increasing test coverage, the test suite of queries is further enhanced by feeding back patterns of customer usage into the rule specification. The rules that encode these patterns may be rigid in the queries that they generate, but these custom rules may be intermixed with rules that are random in nature. Classes of rule specifications may be defined to test various aspects of the XQuery language. Examples include rule specifications that are highly numeric or which manipulate the results from accessing data using XPath. Some control over structure is also possible when executing the query generator in order to limit the depth for recursive expressions. The resulting queries vary in complexity from simple expressions, such as literals to recursively-generated expressions, such as subqueries. Batches of queries of varying complexity may be used to progressively validate a query engine.

FIG. 14 is exemplary rule-specification grammar in accordance with the illustrative embodiments. Rule specification grammar 1400 specifies productions that may be used to write a rule specification, such as the exemplary rule specification in FIG. 15.

Template 1402 is a block of rules each of which has header 1404 and body 1406. Header 1404 identifies the rule and optionally declares whether the rule accepts a formal parameter of sequence type pattern. Body 1406 contains a set of weighted actioning rule clauses. Rule clause 1408 specifies a sequence type pattern to try and match the parameter and an action that concatenates rule invocations.

In pattern match 1410, the specification may be exact or may only require that the parameter be a subset of the pattern. In the event that no match is possible, a default clause conveniently diverts the rule flow to a subsequent rule. Rule actions generate keywords and combine weighted concatenation and alternation to repeat and choose among rule invocations. A rule invocation may indicate a weighted choice of actual parameters of sequence type patterns. The grammar includes syntax to split a sequence type pattern in order to distribute a goal among rule actions. Goal specifications are extensive and include coverage for the various kinds of markup in XML, atomic types, and combinations thereof.

FIG. 15 is an exemplary rule specification in accordance with the illustrative embodiments. Exemplary rule specification 1500 is one example of a rule specification that grammatically conforms to rule specification 1400 of FIG. 14. Comments are enclosed in (: comment :) syntax. Entry points include: module rule 1502 that may generate imported and variable declarations as preamble to an XQuery statement and expression rule 1504 that only generates the XQuery statement. The specification includes examples of rules that generate test coverage which are filter expression rule 1506 that generates predicates to restrict an expression and primary expression rule 1508 that may recurse into the grammar in order to generate recursive expressions or terminate a phrase in an evolving sentence.

Figure 16:
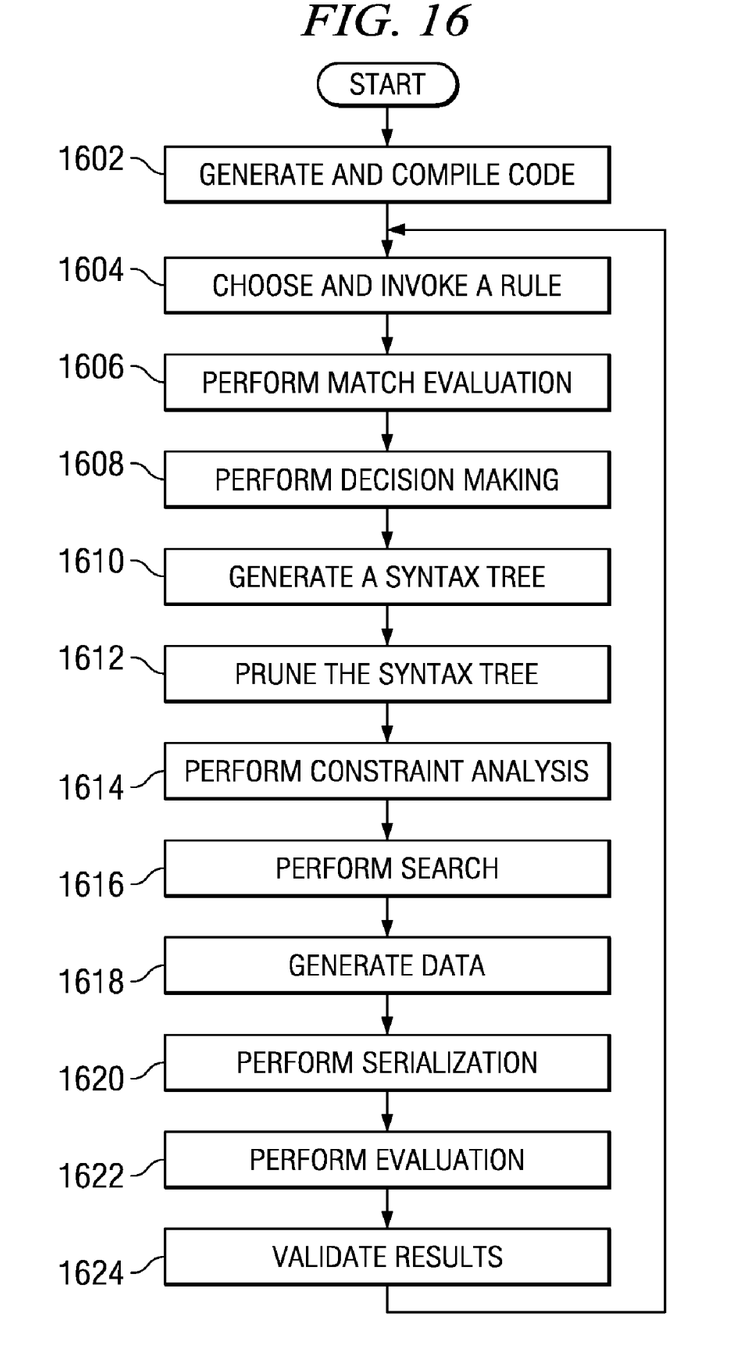
FIG. 16 is a flowchart for a process for generating queries in the XQuery language in accordance with the illustrative embodiments.

FIG. 16 is a flowchart for a process for generating queries in the XQuery language in accordance with the illustrative embodiments. The process may be used to build an XQuery statement and may be implemented by the components of XQuery generator 300 as described in FIG. 3. The process begins by generating and compiling code (step 1602). Step 1602 may be performed by code generation and compilation 310 of FIG. 3. Next, the process chooses and invokes a rule (step 1604). The rule may be chosen and invoked from rule specification 312 of FIG. 3.

Next, the process performs match evaluation (step 1606). During step 1606, the process attempts to match an input goal to a rule clause. Step 1606 may be performed by match evaluation 320 of FIG. 3. Next, the process performs decision making (step 1608). Step 1608 may be performed by decision making 354 of FIG. 3. Next, the process generates a syntax tree (step 1610). The syntax tree may be a syntax tree, such as syntax tree 800 of FIG. 8. The syntax tree describes a sentence and consists of intermediate semantic nodes and terminates in syntactic and semantic nodes. The syntax tree is rooted at a semantic node that is generated from an initial rule. The semantic leaf nodes of the tree are typed. The syntax tree may be generated by tree generation 352 of FIG. 3.

Next, the process prunes the syntax tree (step 1612). During step 1612, the process prunes superfluous semantic nodes that were generated by visiting rules which did not match an input goal. Step 1612 may be performed by pruning 336 of FIG. 3. Next, the process performs constraint analysis (step 1614). Step 1614 and 1616 may be performed by constraint analysis 356 of FIG. 3. Next, the process performs a search (step 1616). In step 1616, the process searches the execution state of the query generator for situations that may reflect user-constraints. For example, the user constraint may be a predicate that filters nodes that match a pattern or a more complex relationship, such as a join of XML fragments related by a predicate.

Next, the process generates data (step 1618). The data generated in step 1618 includes instances of atomic types and direct and computed constructors for XQuery and XPath expressions. Step 1618 is performed by data generation 358 of FIG. 3. Next, the process performs serialization (step 1620). During step 1620, the process traverses the syntax tree from left to right to write out sentences optionally to persistent storage. Serialization is performed by serialization 364 of FIG. 3. Next, the process performs evaluation (step 1622). Step 1622 is the execution of the generated sentence by the database or XQuery engine to test functionality of the engine. Step 1622 is performed by evaluation 306 of FIG. 3. Next, the process validates results (step 1624) with the process returning again to step 1604 to chose and invoke a new rule. During step 1624, the process checks to see that an output or code result is received from the engine based on the processing of the sentence. Step 1624 1. is performed by result validation 368 of FIG. 3. The sequence type pattern presents the ability to drive the generation of test sentences in the XQuery generator.

Specification grammar, such as specification grammar 1400 of FIG. 14, may be used to define a rule specification to drive the generation of XQuery sentences. An implementation, such as exemplary rule specification 1500 of FIG. 15, was suggested for translation to a programming language. Various illustrative embodiments may benefit from reflecting usage patterns and historical data for queries. The longer the process of FIG. 16 is run, the more unique sentences are generated for testing the functionality of the XQuery engine.

Rule specification grammar allows a specification similar to XQuery grammar and behaves like an "inverted" parser in order to generate XQuery sentences. A combination of static and dynamic constraints enforces semantic correctness in the generated queries in accordance with the XQuery language. The illustrative embodiments rely on a scheme for choosing between alternatives during query construction. A translator maps from rule specification to a program language. Data structures are used to model a syntax tree. A primary expression generator produces values that match a given sequence type. The syntax tree may be preordered to materialize a query in the XQuery language.

Thus, the illustrative embodiments provide a computer implemented method, apparatus, and computer usable program code for generating semantically valid queries in the XQuery language. The invention provides a methodology to automatically generate sentences in the XQuery language that are syntactically and semantically valid. The resulting sentences may be used to test the ability of a query processing engine to interpret queries and materialize results. Query tests may be executed concurrently to assess the scalability of the query processing engine. Query tests are effective because of the ability to flush out integration problems and performance bottlenecks for XQuery processing engines. As a result, manual tests that are time consuming and limited do not need to be used as extensively for testing the query engine.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically generating a query to test a query processing engine that processes queries received by the query processing engine, the computer implemented method comprising:
   describing data and occurrence using a sequence type;
   matching the data and the occurrence from the sequence type to a sequence type pattern;
   automatically generating, by a computer processor, sentences in a query language using the sequence type pattern;
   testing an ability of the query processing engine to interpret queries using the sentences that are automatically generated by the computer implemented method;
   defining a grammar wherein the grammar uses the sequence type pattern to drive sentence generation by producing a plurality of tokens in the grammar automatically, wherein the plurality of tokens is consistent with the sequence type pattern, and translating the plurality of tokens into a syntactically valid query in a target language automatically; and
   defining the sequence type pattern wherein the sequence type pattern abstracts a class of query.

2. The computer implemented method of claim 1, wherein the target language of the sentences that are automatically generated is XQuery.

3. The computer implemented method of claim 1, further comprising:
   generating the syntactically valid query automatically based on random or historic queries for testing the query processing engine.

4. The computer implemented method of claim 1, wherein the query is used for testing a database system.

5. The computer implemented method of claim 1, further comprising:
   generating code for a rule clause; and
   executing the rule clause to generate a syntax tree, wherein the syntax tree includes intermediate semantic nodes and terminal syntactic nodes and terminal semantic nodes.

6. The computer implemented method of claim 5, comprising:
   processing the syntax tree to perform data generation.

7. The computer implemented method of claim 1, wherein the generating step is performed using rule-specification grammar and further comprising:
   translating the rule-specification grammar into a programming language.

8. The computer implemented method of claim 6, wherein the processing step further comprises:
   typing the intermediate semantic nodes in leaves in order to generate primary expressions in the query language.

9. The computer implemented method of claim 1, wherein the describing step, matching step, and generating step are performed by a XQuery generator that sends the automatically generated sentences to the query processing engine.

10. The computer implemented method of claim 5, wherein the terminal syntactic nodes represent keywords, wherein leaf semantic nodes are primary expressions.

11. A data processing system comprising:
    a bus system;
    a communications system connected to the bus system;
    a memory connected to the bus system, wherein the memory includes a set of instructions for a XQuery code generator that is operable for automatically generating a query to test a query processing engine that processes queries received by the query processing engine; and
    a processing unit connected to the bus system, wherein the processing unit executes the set of instructions to describe data and occurrence using a sequence type, match the data and the occurrence from the sequence type to a sequence type pattern, automatically generate sentences in XQuery language using the sequence type pattern, test an ability of the query processing engine to interpret queries using the sentences that are automatically generated, define a grammar wherein the grammar uses the sequence type pattern to drive sentence generation by producing a plurality of tokens in the grammar automatically, wherein the plurality of tokens is consistent with the sequence type pattern, translate the plurality of tokens into a syntactically valid query in a target language automatically, and define the sequence type pattern wherein the sequence type pattern abstracts a class of query.

12. The data processing system of claim 11, wherein the sentences are generated randomly for testing features of the query processing engine.

13. The data processing system of claim 11, wherein the set of instructions receives a goal and builds a syntax tree, wherein the syntax tree is processed to generate the sentences.

14. A computer program product comprising a computer usable medium including computer usable program code stored thereon for automatically generating a query to test a query processing engine that processes queries received by the query processing engine when executed in a memory, the computer program product comprising:
    computer usable program code for describing data and occurrence using a sequence type;
    computer usable program code for matching the data and the occurrence from the sequence type to a sequence type pattern;
    computer usable program code for automatically generating sentences in a query language using the sequence type pattern;
    computer usable program code for testing an ability of the query processing engine to interpret queries using the sentences that are automatically generated;
    computer usable program code for defining a grammar wherein the grammar uses the sequence type pattern to drive sentence generation by producing a plurality of tokens in the grammar automatically, wherein the plurality of tokens is consistent with the sequence type pattern, and translating the plurality of tokens into a syntactically valid query in a target language automatically; and computer usable program code for defining the sequence type pattern wherein the sequence type pattern abstracts a class of query.

15. The computer program product of claim 14, further comprising:

computer usable program code for generating code for a rule clause;

computer usable program code for executing the rule clause to generate a syntax tree; and computer usable program code for processing the syntax tree to perform data generation.

\* \* \* \* \*